(12) United States Patent
Mueller

(10) Patent No.: US 10,507,538 B2
(45) Date of Patent: Dec. 17, 2019

(54) METHOD FOR HARD FINE MACHINING OF THE TOOTHING OF A GEAR OR OF A GEAR-LIKE PROFILE OF A WORKPIECE

(71) Applicants: KAPP Werkzeugmaschinen GmbH, Coburg (DE); NILES Werkzeugmaschinen GmbH, Berlin (DE)

(72) Inventor: Frank Mueller, Meeder (DE)

(73) Assignees: KAPP WERKZEUGMASCHINEN GMBH, Coburg (DE); NILES WERKZEUGMASCHINEN GMBH, Berlin (DE)

( * ) Notice: Subject to any disclaimer, the term of this patent is extended or adjusted under 35 U.S.C. 154(b) by 271 days.

(21) Appl. No.: 15/583,603

(22) Filed: May 1, 2017

(65) Prior Publication Data

US 2017/0312838 A1    Nov. 2, 2017

(30) Foreign Application Priority Data

May 2, 2016   (DE) .......................... 10 2016 005 305

(51) Int. Cl.
*B23F 21/02* (2006.01)
*B23F 19/00* (2006.01)

(52) U.S. Cl.
CPC ............ *B23F 21/026* (2013.01); *B23F 19/00* (2013.01); *B23F 21/02* (2013.01)

(58) Field of Classification Search
CPC .......... B24B 1/00; B23F 21/02; B23F 21/026; B23F 21/03
USPC ...................................... 451/5, 8–10, 47, 28
See application file for complete search history.

(56) References Cited

U.S. PATENT DOCUMENTS

| | | | | |
|---|---|---|---|---|
| 3,708,925 A | | 1/1973 | Ainoura | |
| 4,961,289 A | | 10/1990 | Sulzer | |
| 5,379,554 A | * | 1/1995 | Thurman | B23F 21/005 451/177 |
| 6,402,607 B2 | * | 6/2002 | Reichert | B23F 21/03 451/541 |
| 8,313,357 B2 | * | 11/2012 | Heyder | B23F 15/08 451/10 |

(Continued)

FOREIGN PATENT DOCUMENTS

| | | |
|---|---|---|
| DE | 1026595 B | 3/1958 |
| DE | 102004020364 A1 | 1/2006 |

(Continued)

*Primary Examiner* — Robert A Rose
(74) *Attorney, Agent, or Firm* — Lucas & Mercanti, LLP

(57) ABSTRACT

A method for hard fine machining of the toothing of a gear that has an axis of rotation, wherein the toothing is machined with a hard fine machining tool. The machining tool rotates around an axis of rotation during hard fine machining. The method includes: a) Providing a hard fine machining tool that has axially adjacent machining zones, including a first zone for the grinding the toothing and a second zone for fine grinding and/or polishing the toothing; b) Grinding the toothing with the first zone, wherein a first pivoting angle exists between the axis of rotation of the gear and the axis of rotation of the machining tool; c) Fine grinding and/or polishing the toothing with the second zone of the machining tool, wherein a second pivoting angle exists, which is different from the first pivoting angle, between the axis of rotation of the gear and the axis of rotation of the machining tool.

10 Claims, 3 Drawing Sheets

(56) References Cited

U.S. PATENT DOCUMENTS 8,523,634 B2 *  9/2013  Woelfel .................. B23F 1/02
                                                    409/192
2017/0197263 A1  7/2017  Yanase et al.

FOREIGN PATENT DOCUMENTS

| DE | 102010005435 A1 | 7/2011 |
| DE | 10 2016 005 210 A1 | 11/2017 |
| DE | 10 2016 005 305 A1 | 11/2017 |
| EP | 0282046 A2 | 9/1988 |
| EP | 2149425 A1 | 2/2010 |
| EP | 2732893 A1 | 5/2014 |
| WO | 9419135 A1 | 9/1994 |

* cited by examiner

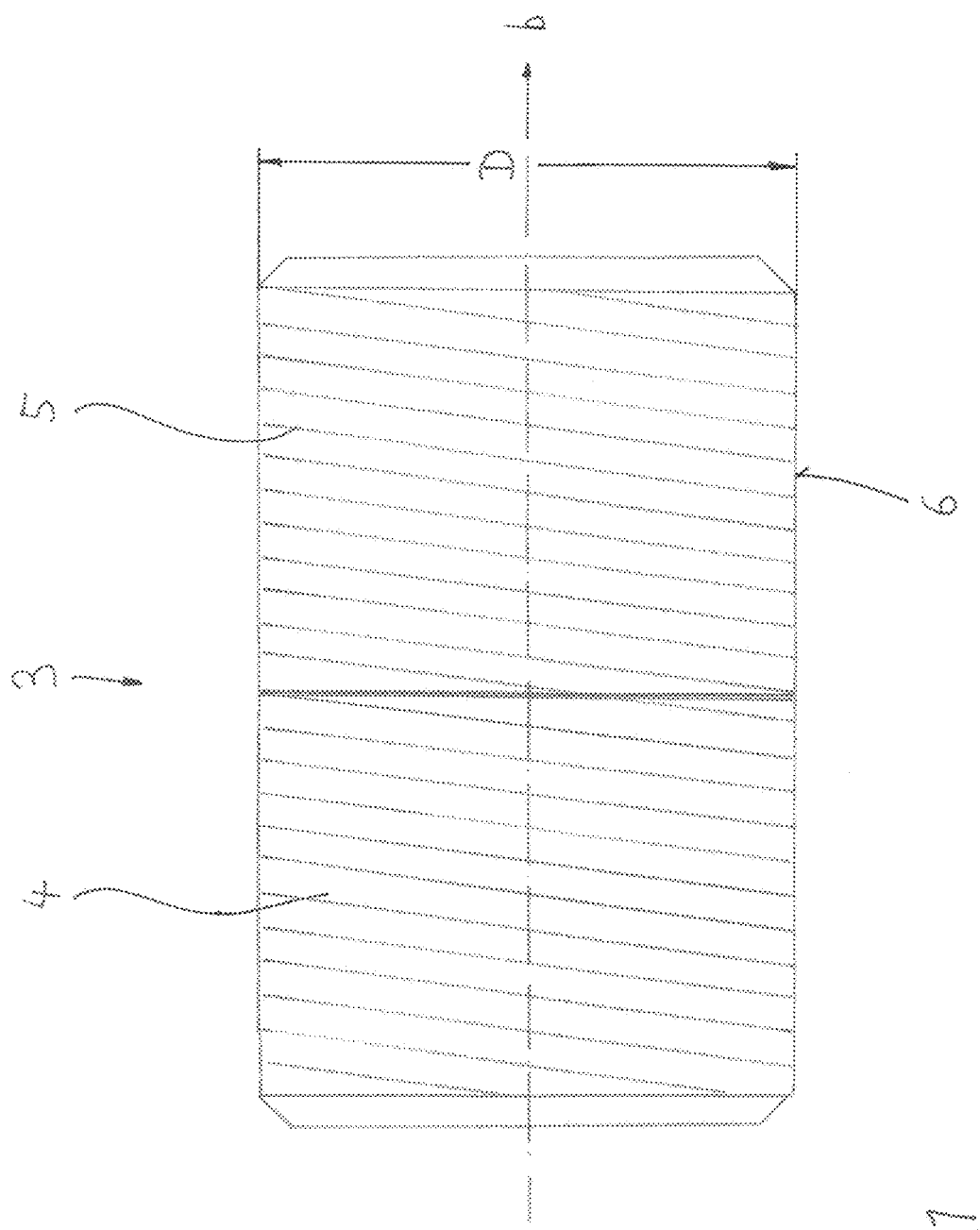

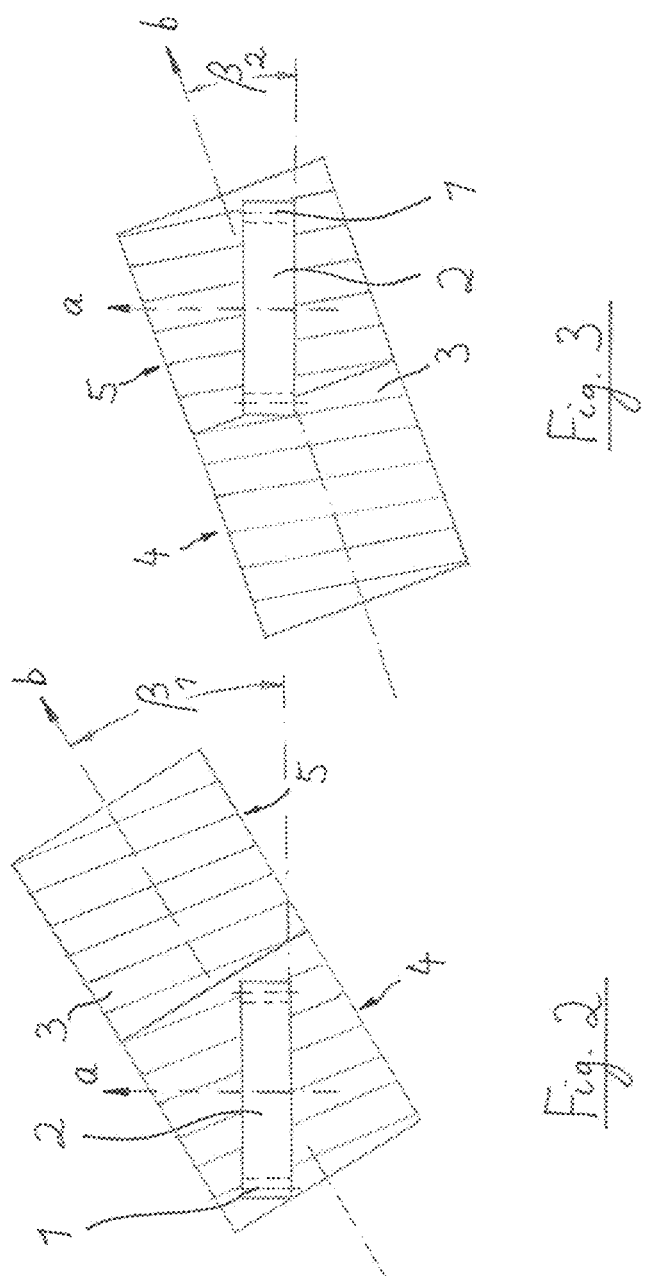

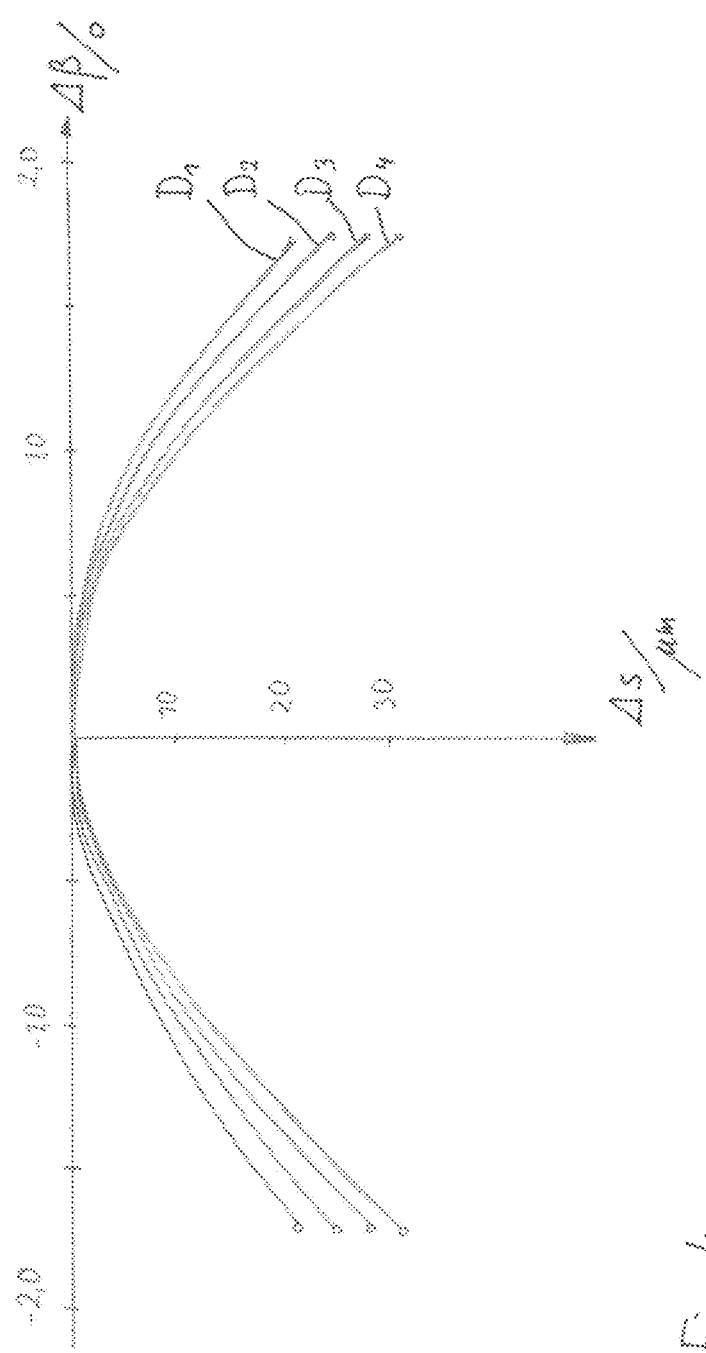

METHOD FOR HARD FINE MACHINING OF THE TOOTHING OF A GEAR OR OF A GEAR-LIKE PROFILE OF A WORKPIECE

CROSS-REFERENCE TO RELATED APPLICATIONS

The present application claims priority of DE 10 2016 005 305.4, filed May 2, 2016, the priority of this application is hereby claimed and this application is incorporated herein by reference.

BACKGROUND OF THE INVENTION

The invention relates to a method for hard fine machining of the toothing of a gear or of a gear-like profile of a workpiece, wherein the gear or the workpiece has an axis of rotation, wherein at the method the toothing of the gear or the gear-like profile of the workpiece is machined with a hard fine machining tool, wherein the hard fine machining tool has an axis of rotation and rotates around the same during hard fine machining.

The final grinding process has a high importance especially at the production of gears. At this process the tooth flanks are subject to a grinding operation by which the flanks are brought to the precise shape. An efficient process at the production of the toothing is the generative grinding by means of a grinding worm or the profile grinding with a profile grinding wheel.

A method of the kind mentioned above is known from DE 10 2010 005 435 A1. Here, at first a rough machining and then a finish machining is carried out at a workpiece to machine a toothing which is arranged in a face region of the workpiece, wherein the tool spindle is pivoted between the two process steps to avoid collisions.

Further pre-known solutions are shown in WO 94/19135 A1, in U.S. Pat. No. 6,402,607 B2 and in U.S. Pat. No. 3,708,925.

It is known for the optimization of the surface of the flanks of the toothing to carry out beside the grinding process as such afterwards a fine grinding process or a polishing process. Such a fine grinding process or polishing process is also called a polishing grinding process and is a subsequent machine finishing process by which the quality of the surface of the toothing can be increased. It is the aim of the machining at said fine grinding or polishing process to increase the surface quality and the percentage contact of the tooth flanks by an only minor amount of removal.

Thereby, a multi-step process is employed at which at first a conventional generative grinding or profile grinding process is carried out and subsequently the mentioned fine or polishing grinding follows. Thereby, two different tool specifications are used which differ from another only marginal or not a bit with respect to their tool shape or profile. Often, both regions for the generative or profile grinding at the one hand and for the fine or polishing grinding at the other hand are arranged at one and the same tool carrier and firmly connected with another (e. g. glued or screwed). Preferably, both machining zones are then at first (in the case of a dressable tool) collectively dressed. Subsequently, the fine grinding and polishing tool respectively can also be slightly modified by a further profiling; thereby for example a reduction of the outer diameter can take place. At the subsequent machining the two mentioned zones are then used successively, wherein however in principle the same tool settings and especially the same pivot angle of the tool are used.

Thereby it is possible to realized corrections at the fine grinding and polish grinding respectively. Known possibilities of correction are the pivoting of the workpiece axis to reduce an infeed rate and the polishing pressure respectively at one of the tooth flanks and to increase the same at the other flank as well as changing of the distances of the axis which then acts on both tooth flanks equally at symmetrical profiles.

However, often detrimentally the roughness in the tip and in the base of the toothing is different what is not desired. The mentioned pre-known possibilities for correction can solve this problem only limited. So, for example a reduction of the distance of the axis increases the machining forces and causes possibly an undesired discrepancy in the shape.

Furthermore, it is detrimental that the known solutions are very time consuming because different working steps for the setting are necessary, wherein however the desired results are often not reached.

Furthermore, it is detrimental that the obtained results are often compromises with respect to the geometry of the created tooth flank.

SUMMARY OF THE INVENTION

Thus, it is an object of the invention to provide a method of the kind mentioned above by which it is possible to obtain an improvement of the surface quality of the toothing and of the gear-like profile respectively. Thereby, the above mentioned drawbacks at the correction during the fine or polishing grinding process should be avoided so that the desired geometry of the tooth flank is obtained precisely.

The solution of this object by the invention is characterized in that the method comprises the steps:

a) Providing of a hard fine machining tool which comprises at least two axially adjacent machining zones, wherein a first machining zone is designed for the grinding of the toothing of the gear or of the gear-like profile of the workpiece and wherein a second machining zone is designed for the fine grinding and/or polishing of the toothing or of the gear-like profile;

b) Grinding of the toothing of the gear or of the gear-like profile of the workpiece with the first machining zone of the hard fine machining tool, wherein between the axis of rotation of the gear or of the workpiece and the axis of rotation of the hard fine machining tool a first pivoting angle is existent;

c) Subsequent fine grinding and/or polishing of the toothing of the gear or of the gear-like profile of the workpiece with the second machining zone of the hard fine machining tool, wherein between the axis of rotation of the gear or of the workpiece and the axis of rotation of the hard fine machining tool a second pivoting angle is existent, which is different from the first pivoting angle.

Preferably, a worm-like tool is used as hard fine machining tool. Alternatively, it is possible that a disk-shaped tool is used as hard fine machining tool.

Preferably, furthermore a dressable tool is used as hard fine machining tool.

Preferably the profile of the hard fine machining tool is identical in the first and in the second machining zone.

A tool can be used as hard fine machining tool which carries abrasive material in a base body, wherein the modulus of elasticity of the material of the base body in the first machining zone and in the second machining zone are different. Preferably the modulus of elasticity of the material of the base body in the first machining zone is higher than in the second machining zone. Specifically according to an embodiment of the invention it is provided that a tool is used as hard fine machining tool which has a base body made of ceramic material in the first machining zone and which has a base body in the second machining zone which comprises plastic material, especially polyurethane. Then, the tool is more elastic in the second zone which can favour the polishing grinding.

A characteristic diagram or a formula relation can be stored in a machine control which provides or allows the calculation or simulation of a difference of angle between the first and the second pivoting angle for a given diameter of the hard fine machining tool and a desired amount of removal at a flank of the toothing or of the gear-like profile during above mentioned step c). Thereby, it can specifically be provided that at the execution of above step c) the required difference of angle between the first and the second pivoting angle is recalled, calculated or simulated from the characteristic diagram or the formula relation and realized after specification of a desired amount of removal at a flank of the toothing or of the gear-like profile.

Insofar, the invention provides that as the possibility of correction in the above mentioned sense the tool pivot angle is used. Deviating from the theoretical calculated pivot angle which is used for the pre-machining (thus at the generative or profile grinding) now a correction of the pivot angle for the fine grinding and polish grinding respectively is used (thus at the polishing grinding).

Thereby, depending on the diameter of the tool a desired specification (i. e. an amount of removal from the flank of the toothing and from the profile respectively given in micrometer) can be converted in a correction of the pivoting angle (in degrees) and then calculated with the theoretical pivoting angle.

I found that it is easier by such a correction of the pivoting angle of the tool to increase the polishing pressure during the fine or polishing grinding without obtaining the detrimental deviations of the shape or also different values of the roughness in the tip and base of the tooth. So, the setting of the process parameter is facilitated and the quality of the toothing and the profile respectively is increased.

Thus, according to the proposed concept the pivoting angle of the grinding head during fine grinding or polishing process (with the second machining zone of the tool) is changed compared with the grinding or pre-machining (with the first machining zone of the tool), whereby the pressure of the tool on the flank of the toothing is changed and so the amount of removal is influenced.

However, as the radial influence of the tool onto the workpiece remains unchanged tolerances in the shape of the toothing or profile can be maintained in an improved manner.

The proposed method is suitable for the fine grinding and polishing respectively of gears and special profiles.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWINGS

In the drawings:
FIG. 1 shows the side view of a worm-shaped tool,
FIG. 2 shows the side view of the tool according to FIG. 1 meshing with a gear during generative grinding,
FIG. 3 shows the side view of the tool according to FIG. 1 meshing with the gear during fine grinding or polishing grinding and
FIG. 4 shows a head curve from which a required changes of the pivoting angle results in dependence on a desired amount of removal for different diameters of the grinding worm.

DETAILED DESCRIPTION OF THE INVENTION

It was found that an increase of the degree of efficiency of a gearing is possible without drawbacks concerning the stability if the surface roughness of the tooth flanks is reduced and gearbox oils with low viscosity are used. The base are studies at gearings which have been produced by vibratory grinding as the finishing process. However, especially from a viewpoint of the producer of gearings this method is not suitable for the integration in an automated process chain. Thus, it was investigated and shown that a quality of finish of Rz equal or less 1 μm can be produced by the integration of a fine grinding process on conventional gear grinding machines. Modern machines of this kind provide the possibility to use the technology of fine grinding at the profile grinding as well as at the generative grinding.

At the profile grinding at first a fine grinding wheel is used additionally to the conventional grinding wheel, which can be dressable or dressing-free. Both tools can be mounted on the same tool mandrel. After the termination of the conventional grinding process the desired high quality of finish is produced in a further grinding process with the fine grinding wheel in the same clamping.

In the field of volume production of gears mostly the continuous generative grinding is used due to its beneficial productivity. By the use of combined tools, consisting of a conventional and a fine grinding tool, in one clamping gears can be produced with a quality of finish (Rz) in the range of less than 1 μm. Thereby, the additional required work is normally only less than 50% of the machining time of the conventional grinding process.

According to the present embodiment a hard fine machining tool 3 being a grinding worm is used. This serves for the combined generative grinding and subsequent fine grinding or polishing grinding. For doing so the hard fine machining tool 3 has a first machining zone 4 and a second machining zone 5. The first machining zone 4 serves for the generative grinding while the second machining zone 5 serves for the polishing grinding. In the present case the hard fine machining tool 3 is a dressable tool, i. e. the profile 6 of the tool is created by a dressing process. Furthermore, in the present case it is provided that the worm-shaped profile 6 is identical in both zones 4 and 5.

However, it can be provided that the carrier material and base material respectively of the tool 3 is different in the two zones 4 and 5. While in the zone 4 of the grinding worm classical ceramic material is used which is provided with abrasive material a softer or more flexible material (concretely: a material with lower module of elasticity) like for example polyurethane can be used in the zone 5 of the polishing grinding worm so that the tool 3 has here a higher degree of elasticity which can be beneficial for the polishing grinding.

During the machining the hard fine machining tool 3 rotates around the axis of rotation b. Apart from that the hard fine machining tool has a diameter D.

In the FIGS. 2 and 3 schematically the process situation during the generative grinding (FIG. 2) and during the subsequent polishing grinding (FIG. 3) is shown. In accordance with this it is can be seen that in known manner during the hard fine machining the hard fine machining tool 3 meshes with a workpiece in the form of a gear 2 which has to be machined and namely with the toothing 1 of the same, wherein the gear 2 rotates around its axis of rotation a while the hard fine machining tool 3 rotates around the axis of rotation b.

As can be seen in FIG. 2 for the generative grinding which is the first sub-step of the hard fine machining the first machining zone 4 of the hard fine machining tool 3 is used, wherein here between the axis of rotation a of the gear 2 and the axis of rotation b of the hard fine machining tool 3 a first pivoting angle $\beta_1$ is given (shown in the figures and denoted with $\beta$ is finally the complementary angle to 90°). This pivoting angle $\beta_1$ relates to the theoretical angle which must be given between the axes of workpiece and tool to produce the desired profile by means of generative grinding ideally.

Is the generative grinding—according to FIG. 2—carried out the polishing grinding follows which is the second and terminal sub-step of the hard fine machining. For doing so the second machining zone 5 of the hard fine machining tool 3 is used. It is essential that also now again a pivoting angle between the axis of rotation a of the gear 2 and the axis of rotation b of the hard fine machining tool 3 is given, that however now it is a second pivoting angle $\beta_2$ which is different from the first pivoting angle $\beta_1$, thus from the ideal pivoting angle which must be given when the ideal geometry of the toothing 1 is ground.

Due to a deviation of the second pivoting angle $\beta_2$ from the first pivoting angle $\beta_1$, thus at a given difference of angle $\Delta\beta$, it results that an additional amount of removal $\Delta s$ from the tooth flanks of the toothing 1 is removed.

This situation is shown in FIG. 4. Here, said amount of removal $\Delta s$ is shown in dependence on the difference of angle $\Delta\beta$ namely for different diameters D of the grinding worm 3. Thereby, the diameter $D_1$ is the smallest and the diameter $D_4$ of the biggest diameter of the grinding worm 3. The characteristic curves which are shown in FIG. 4 can be stored in the machine control or can be calculated and simulated respectively there by means of a stored formula so that it can be accessed to the same when after the generative grinding the polishing grinding has to be carried out. At known and predetermined diameter D of the (polishing) grinding worm it can be determined immediately for a desired amount of removal $\Delta s$ how big the difference of angle $\Delta\beta$ must be to obtain the desired result. The difference of angle which is required for the polishing grinding can accordingly be stored either directly as a set of curves for a special application in the machine control; also it is possible that the difference of angle is calculated in the machine control by means of predetermined variables (diameter of the worm, desired amount of removal) or is calculated by means of simulations and then the determined difference of angle is used for the polishing grinding.

In the present embodiment a two-part grinding worm 3 is employed which is profiled with one and the same dressing device for the flanks.

In the FIGS. 2 and 3 schematically the process situation during the generative grinding (FIG. 2) and during the subsequent polishing grinding (FIG. 3) is shown. In accordance with this it is can be seen that in known manner during the hard fine machining the hard fine machining tool 3 meshes with a workpiece in the form of a gear 2 which has to be machined and namely with the toothing 1 of the same, wherein the gear 2 rotates around its axis of rotation a while the hard fine machining tool 3 rotates around the axis of rotation b.

As can be seen in FIG. 2 for the generative grinding which is the first sub-step of the hard fine machining the first machining zone 4 of the hard fine machining tool 3 is used, wherein here between the axis of rotation a of the gear 2 and the axis of rotation b of the hard fine machining tool 3 a first pivoting angle $\beta_1$ is given (shown in the figures and denoted with $\beta$ is finally the complementary angle to 90°). This pivoting angle $\beta_1$ relates to the theoretical angle which must be given between the axes of workpiece and tool to produce the desired profile by means of generative grinding ideally.

Is the generative grinding—according to FIG. 2—carried out the polishing grinding follows which is the second and terminal sub-step of the hard fine machining. For doing so the second machining zone 5 of the hard fine machining tool 3 is used. It is essential that also now again a pivoting angle between the axis of rotation a of the gear 2 and the axis of rotation b of the hard fine machining tool 3 is given, that however now it is a second pivoting angle $\beta_2$ which is different from the first pivoting angle $\beta_1$, thus from the ideal pivoting angle which must be given when the ideal geometry of the toothing 1 is ground.

Due to a deviation of the second pivoting angle $\beta_2$ from the first pivoting angle $\beta_1$, thus at a given difference of angle $\Delta\beta$, it results that an additional amount of removal $\Delta s$ from the tooth flanks of the toothing 1 is removed.

This situation is shown in FIG. 4. Here, said amount of removal $\Delta s$ is shown in dependence on the difference of angle $\Delta\beta$ namely for different diameters D of the grinding worm 3. Thereby, the diameter $D_1$ is the smallest and the diameter $D_4$ of the biggest diameter of the grinding worm 3. The characteristic curves which are shown in FIG. 4 can be stored in the machine control or can be calculated and simulated respectively there by means of a stored formula so that it can be accessed to the same when after the generative grinding the polishing grinding has to be carried out. At known and predetermined diameter D of the (polishing) grinding worm it can be determined immediately for a desired amount of removal $\Delta s$ how big the difference of angle $\Delta\beta$ must be to obtain the desired result. The difference of angle which is required for the polishing grinding can accordingly be stored either directly as a set of curves for a special application in the machine control; also it is possible that the difference of angle is calculated in the machine control by means of predetermined variables (diameter of the worm, desired amount of removal) or is calculated by means of simulations and then the determined difference of angle is used for the polishing grinding.

In the present embodiment a two-part grinding worm 3 is employed which is profiled with one and the same dressing device for the flanks.

While specific embodiments of the invention have been shown and described in detail to illustrate the inventive principles, it will be understood that the invention may be embodied otherwise without departing from such principles.

I claim:

1. A method for hard fine machining of the toothing of a gear or of a gear-like profile of a workpiece, wherein the gear or the workpiece has an axis of rotation, wherein at the method the toothing of the gear or the gear-like profile of the workpiece is machined with a hard fine machining tool, wherein the hard fine machining tool has an axis of rotation and rotates around the same during hard fine machining, wherein the method comprises the steps:

a) providing a hard fine machining tool which comprises at least two axially adjacent machining zones, wherein a first machining zone is designed for the grinding of the toothing of the gear or of the gear-like profile of the workpiece and wherein a second machining zone is designed for the fine grinding or polishing of the toothing or of the gear-like profile, wherein a profile of the hard fine machining tool in the first machining tool is identical to a profile of the hard fine machining tool in the second machining zone;

b) grinding the toothing of the gear or of the gear-like profile of the workpiece with the first machining zone of the hard fine machining tool, wherein between the axis of rotation of the gear or of the workpiece and the axis of rotation of the hard fine machining tool a first pivoting angle is existent;

c) fine grinding or polishing the toothing of the gear or of the gear-like profile of the workpiece with the second machining zone of the hard fine machining tool, wherein between the axis of rotation of the gear or of the workpiece and the axis of rotation of the hard fine machining tool a second pivoting angle is existent, which is different from the first pivoting angle.

2. The method according to claim 1, wherein the hard fine machining tool includes a grinding worm having the first machining zone and the second machining zone.

3. The method according to claim 1, wherein a disk-shaped tool is used as the hard fine machining tool.

4. The method according to claim 1, wherein a dressable tool is used as the hard fine machining tool.

5. The method according to claim 1, wherein a tool is used as the hard fine machining tool which carries abrasive material in a base body, wherein the modulus of elasticity of the material of the base body in the first machining zone and in the second machining zone are different.

6. The method according to claim 5, wherein the modulus of elasticity of the material of the base body in the first machining zone is higher than in the second machining zone.

7. The method according to claim 6, wherein a tool is used as the hard fine machining tool which has a base body made of ceramic material in the first machining zone and which has a base body in the second machining zone which comprises plastic material.

8. The method according to claim 1, wherein a characteristic diagram or a formula relation is stored in a machine control which provides or allows the calculation or simulation of a difference of angle between the first and the second pivoting angle for a given diameter of the hard fine machining tool and a desired amount of removal at a flank of the toothing or of the gear-like profile during the step c).

9. The method according to claim 8, wherein at the execution of the step c) the required difference of angle between the first and the second pivoting angle is recalled, calculated or simulated from the characteristic diagram or the formula relation and realized after specification of a desired amount of removal at a flank of the toothing or of the gear-like profile.

10. The method according to claim 7, wherein the base body in the second machining zone comprises polyurethane.

* * * * *